United States Patent [19]

Seidl

[11] Patent Number: 5,710,896
[45] Date of Patent: Jan. 20, 1998

[54] OBJECT-ORIENTED GRAPHIC SYSTEM WITH EXTENSIBLE DAMAGE REPAIR AND DRAWING CONSTRAINTS

[75] Inventor: Robert Seidl, Palo Alto, Calif.

[73] Assignee: Object Technology Licensing Corporation, Cupertino, Calif.

[21] Appl. No.: 611,833

[22] Filed: Mar. 6, 1996

Related U.S. Application Data

[63] Continuation of Ser. No. 146,631, Oct. 29, 1993, abandoned.

[51] Int. Cl.$^6$ .................................................. G06F 17/30
[52] U.S. Cl. ......................................... 395/333; 395/501
[58] Field of Search ................................. 395/326, 327, 395/328, 329, 333, 334, 335, 339, 340, 683, 701, 702, 703, 800

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,206,951 | 4/1993 | Khoyi et al. | 395/650 |
| 5,226,161 | 7/1993 | Khoyi et al. | 395/650 |
| 5,255,211 | 10/1993 | Redmond | 364/578 |
| 5,261,080 | 11/1993 | Khoyi et al. | 395/500 |
| 5,303,379 | 4/1994 | Khoyi et al. | 395/700 |
| 5,388,264 | 2/1995 | Tobias, II et al. | 395/650 |
| 5,446,842 | 8/1995 | Schaeffer et al. | 395/200.01 |

OTHER PUBLICATIONS

Byte, V.11(8), Aug. 1986, St. Peterborough US, pp. 189–193, Schmucher "MacApp: An Application Framework".

Byte, V.14(3), Mar. 1989, St. Peterborough US, pp. 255–262, Dodani et al. "Separation of Powers".

*Primary Examiner*—Thomas G. Black
*Assistant Examiner*—Ruay Lian Ho
*Attorney, Agent, or Firm*—Bookstein & Kudirka

[57] ABSTRACT

A method and apparatus for developing graphics applications, including a framework for handling the exchange of graphical data between applications and for presenting and manipulating graphical objects. The framework includes a number of classes which are used by the application developer to facilitate the interaction between the major subsystems, Models, Views and User Interface, of the system architecture.

52 Claims, 12 Drawing Sheets

OBJECT-ORIENTED GRAPHIC SYSTEM WITH EXTENSIBLE DAMAGE REPAIR AND DRAWING CONSTRAINTS

This is a continuation of application Ser. No. 08/146,631 filed on Oct. 29, 1993.

BACKGROUND OF THE INVENTION

1. Field of the Invention

The present invention generally relates to an object-oriented framework system which simplifies the interaction between Models, View System and the User Interface. The invention is disclosed in terms of a preferred embodiment which uses a popular object-oriented programming language, C++, but the principles are applicable to other computer programming languages both object-oriented and procedural.

2. Description of the Prior Art

Object-oriented programming (OOP) is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C. The key concept of C++ is class, which is a user-defined type. Classes provide object-oriented programming features. C++ modules are compatible with C modules and can be linked freely so that existing C libraries may be used with C++ programs. The most widely used object based and object-oriented programming languages trace their heritage to Simula developed in the 1960s by O -J. Dahl, B. Myhrhaug and K. Nygrad of Norway. Further information on the subject of OOP may be had by reference to *Object-oriented Design with Applications* by Grady Booch, the Benjamin/Cummings Publishing Co., Inc., Redwood City, Calif. (1991).

SUMMARY OF THE INVENTION

It is therefore an object of the present invention to provide an object-oriented framework for building graphics applications. The framework includes a number of classes which implement various functions to facilitate the exchange of graphic information between the subsystems of the operating system and within an application. In addition, the framework is capable of being customized and overridden by the application developer should more complicated features or functions be desired.

According to the invention, there is provided an object-oriented framework for developing applications with graphical editing capabilities, in which a plurality of classes are provided, which define default interactions between the subsystems of the system architecture and between the application and other applications. The classes provide methods for drawing, interaction, manipulation and presentation of graphic objects and data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
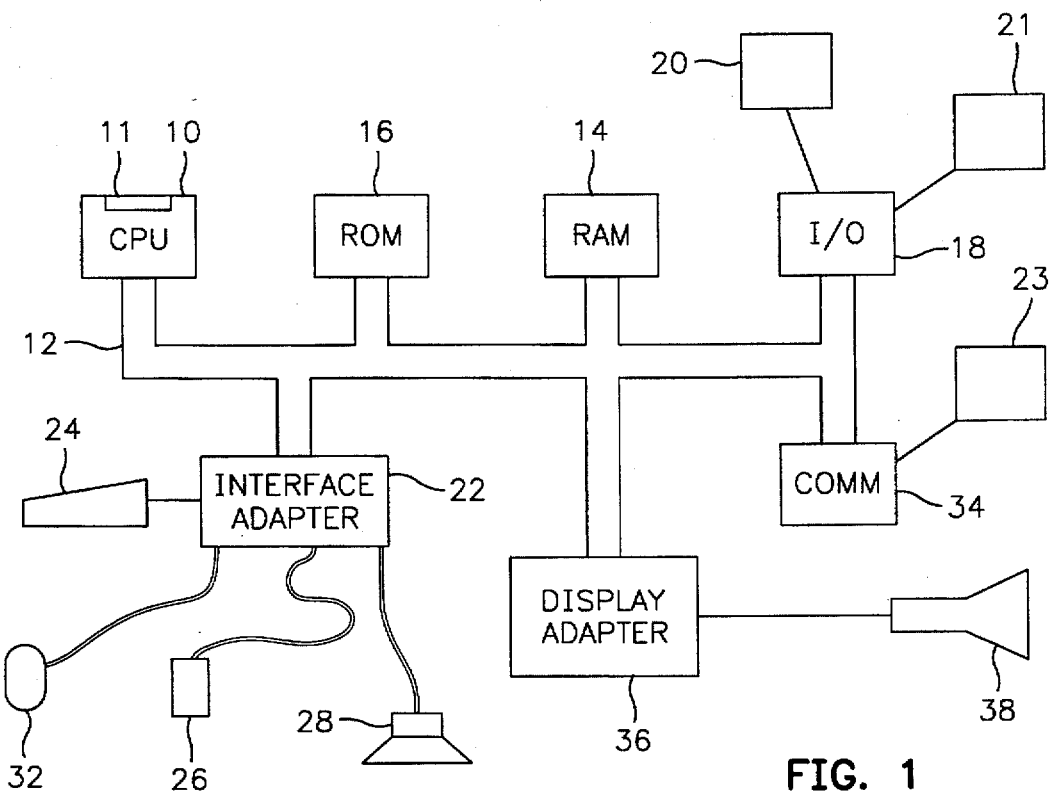
FIG. 1 is a block diagram of a computer system in accordance with a preferred embodiment.
Figure 2:
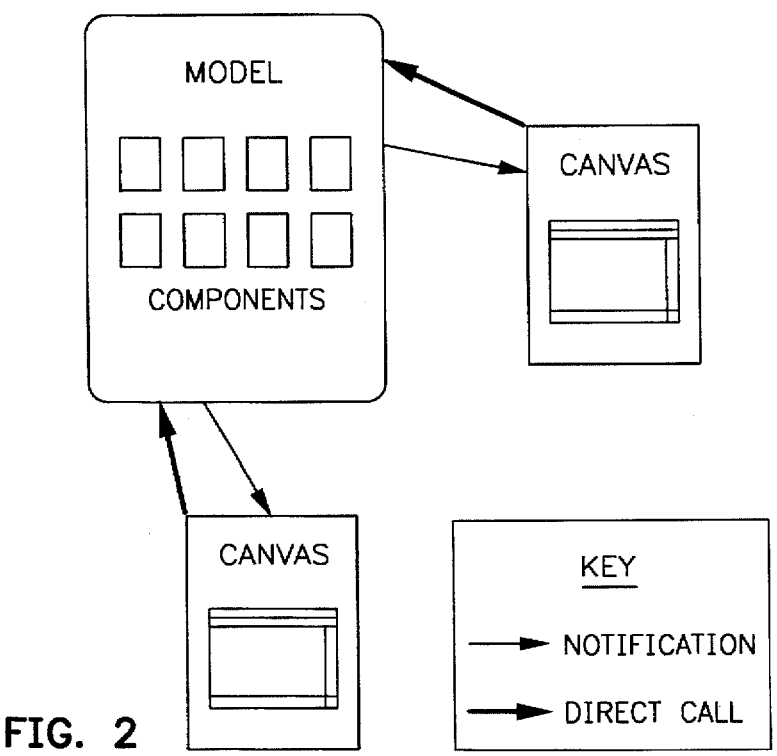
FIG. 2 shows the interaction between the fundamental base classes of the graphical editor framework in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by ifs data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs,* University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are Interviews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using systems framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level for services such as graphics, multi-media, file systems, I/O, testing, etc. Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. It is important to an appreciation of the nature of the invention to understand the concept of a "framework" and the relationship of a framework to "objects" and "object-oriented programming". "MacApp: An Application Framework" by Kurt A. Schmucker, published in Byte magazine in August 1986 is an early article describing a framework and the basic concepts embodied therein, which is hereby fully incorporated by reference. An important property of objects is their ability to encapsulate data and methods for which the object is responsible. That is, a generic command may be issued to an object without the need for any other object to know the internal details of how the object will carry out the command. By the same token, there is no need for global compatibility of commands, data, file names and the like and thus objects may be freely associated with one another. A framework is, in essence, a generic application comprising an association of classes of objects with which other objects may be associated, as necessary, to form a more specific application. The framework, as an association of classes of objects with functional interrelationships between classes of objects defined therein may provide any desired degree of general or specific functionality of additional objects which may be associated with the framework.

A framework may thus be regarded as a system which provides an implied network of responsibilities between objects, provides for inheritance between classes of objects (e.g. data and methods of superclasses at higher hierarchical levels of classes of objects), and provides for calling of libraries in response to events. A system formed as a framework may also be customized by the addition of objects which perform more specific functions and which may also override functions provided by the framework. Machine-specific and device-specific objects in various classes and subclasses of the framework allow the framework, itself, to be machine- and device-independent and of generalized applicability. Further, a particular framework is characterized by the interrelationships it establishes between objects and classes of objects in terms of division of responsibilities and inheritance and the functionality it thus achieves. A framework, itself, is also useful as a template for the development of specific applications in which customization and functional overrides may be provided as specific objects therein.

A graphical editor model is based on object-oriented programming principles. The general concepts of object-oriented programming are briefly described above and are believed to be known and will not be described in detail here. Very generally, data is abstracted and encapsulated, with objects representing or containing graphic object information being represented by varying data formats without changing the overall architecture. The interfaces to the object remain constant, with the objects themselves being abstract and independent.

The class or object in object-oriented programming design encapsulates structure (e.g., data) and behavior (e.g., so-called "method functions") which operate on the structure. In object-oriented design, an interface is an outside view of a class or object while hiding the structure and behavior of the class or object. Additionally, all objects descending from a base class inherit the properties of the base class and thus will have the same properties thereof and are polymorphic with respect to base class operations. Hence, objects descending from the base class can be used to represent an instance of the base class and can be substituted whenever a base class is called.

Figure 3A:
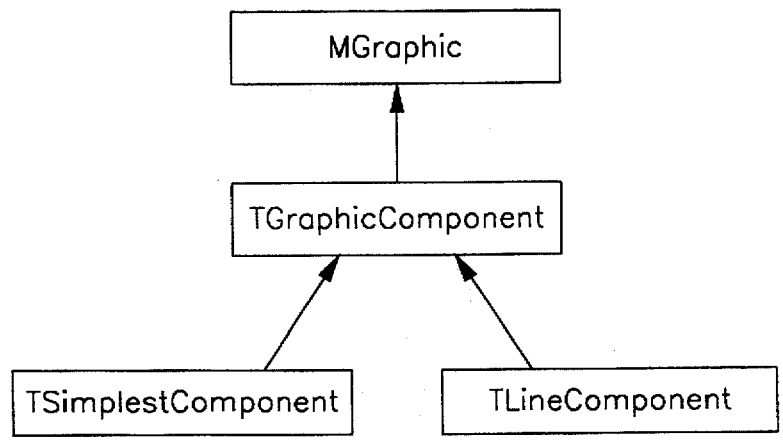
FIG. 3A illustrates the relationship of a component base class to other classes in accordance with a preferred embodiment.

In the graphical editor framework (GrafEdit), there are three fundamental base classes, Model, Component, and Canvas. FIG. 3A provides a visual overview of the relationship between these three fundamental base classes. As shown in FIG. 3A, Models hold Components while the Canvas class displays the information and reflects any changes to the Components, graphical object types.

The Model base class, TGrafEditModel, is a data store class, it can hold a plurality of graphic components and other models, both GrafEdit and otherwise. The Model class defines the basic access to the Component methods but not their storage implementation. In addition, the Model base class can be used as the root Model. This class acts as a store for components by defined methods to access components and therefore their data. The default implementation uses a simple flat storage system, an ordered list, to store the components. If a different storage system is required, the developer can override and customize this system by subclassing from TGrafEditModel. The Model base class provides a number of methods which perform actions on components within a Model.

A first group of methods allow the addition, deletion and access to Component data. Another method is provided which allows the order of the components to be modified. This is important because, as a default, the information is used to draw on the screen. Methods are also provided which create iterators to traverse the Component data. There are two types of iterations provided, ordered, front to back or unordered. The Model base class also provides a method which can specify and add Model-wide menus. Finally, methods are available to create all of the GrafEdit Selections used by the framework. This allows an applications developer to override the GrafEdit Selection class. The methods provided for executing actions which affect the components can be executed in two ways. The first is through a direct call. The second uses ModelCommand to call the method, this mechanism allows the command to be undone.

The Component base class, TGraphicComponent, stores graphic components and defines drawing, interaction and manipulation methods. FIG. 4 illustrates the basic relationship of TGraphicComponent to other classes which involve graphic objects. As shown in the diagram, all of the classes depend from MGraphic, which means that they inherit its functionality. As noted above, TGraphicComponent is the abstract base class for components. The remaining classes shown illustrate implementations, TSimplestComponent implements all of the TGraphicComponent methods using a wrapped MGraphic and TLineComponent is an example of a concrete class.

In addition to the inherited functionality of MGraphic, TGraphicComponent provides unique identification of components for storage in GrafEdit selections and for use in the comparison of components. It also provides an interactor to edit the Component, a selection feedbacker to specify the Component's behavior and an iterator to iterate over the components sockets.

Some examples of concrete implementations are shown as TSimplestComponent and TLineComponent. TSimplestComponent is an implementation that uses an MGraphic to implement TGraphicComponent virtual methods. This implementation is useful to polymorphically create components from arbitrary MGraphics which is likely to occur when a non-GrafEdit 'application' wishes to convert its MGraphics into components. On the other hand, TLineComponent is used to show where the hierarchy should be subclassed.

TCanvasView

TCanvasView is a subclass of TView. It is one of the primary routines used by GrafEdit because it prepares and displays a document and facilitates user interaction with the document. The document startup sequence will call the model's CreateEditablePresentation, which in turn creates a canvas view. For example, a menu item could create another view which could be independently scrolled. All views get notified when data in the model changes—essentially they all provide different presentations of the same data. So if a component is dragged in one view, it automatically moves in the other view. This is not the same as collaboration, which happens across address spaces, but the effect looks similar. The constructor for a component canvas TComponentCanvas, takes a model and a model argument in addition to the usual size and location. There is also an optional argument fitToView which has nothing to do with the nature of the graphic material displayed. Instead, if it is set to TRUE, the canvas scales its presentation so that all contents are always visible, regardless of size. This feature is useful for thumbnail displays of a canvas, such as those used in the Scrapbook.

Updating policy

Figure 3B:
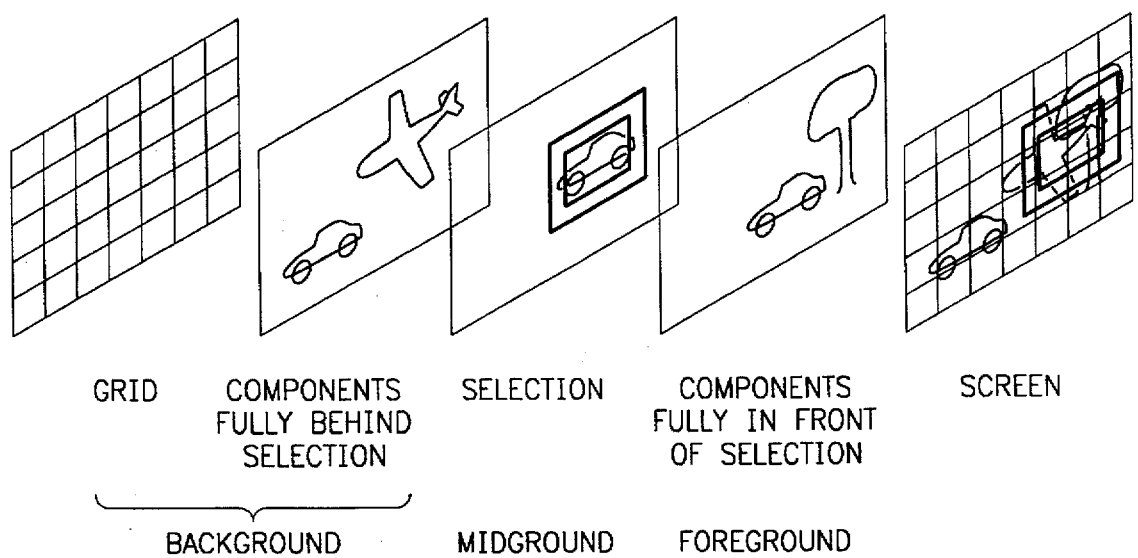
FIG. 3B illustrates the components in the graphic model in accordance with a preferred embodiment.

There are many ways to update an on-screen image. Any updating procedure is a compromise between update quality (flickering), memory cost (buffers) and update speed (redraw vs. copybits). Isolating the details of your updating policy from the rest of the canvas implementation facilitates easy exchange or re-implementation without the need to subclass the component canvas. The component canvas has an object which is a subclass of TCanvasUpdater, which facilitates policy decisions. The canvas class also maintains data structures which support pluggable updaters. In particular, it maintains three lists that partition all components in the model into equivalence classes. 1. Background objects: all objects that are fully behind all objects currently selected. 2. Foreground objects: all objects that are fully in front of all objects currently selected. 3. Midground consists of all components not in the background or foreground. FIG. 3B illustrates the components in the graphic model in accordance with a preferred embodiment.

The whole point of this approach is to separate parts of the final image that will change during a track (midground) from those that will not. The canvas calls update object methods such as DamageMidground, DamageForeground and DamageBackground. Usually, the updaters will accumulate damage and then redraw whatever is necessary whenever it becomes necessary. Of course, an update object can choose to ignore this information. The detailed description of the updating object shows how various strategies can be implemented. A canvas calls an updater's Draw method when necessary. The updater will then determine whether any buffers must be updated. The updater will then call back into the canvas using DrawBackground, DrawMidground, DrawForeground. These routines simply iterate over the (private) lists the canvas maintains drawing the appropriate components. The default implementation draws the grid (if it is on) behind all other components in DrawBackground. The canvas DrawXXXground methods are only meant to be called from an updater object. In addition to a TGrafPort pointer, these methods also get a TGRect which is the area that needs to be redrawn. Eventually, this parameter may become a TGArea. It supports trivial rejection of all components outside the damaged area and faster updates.

Canvas Accessories

Canvas Updaters

Figure 4A:
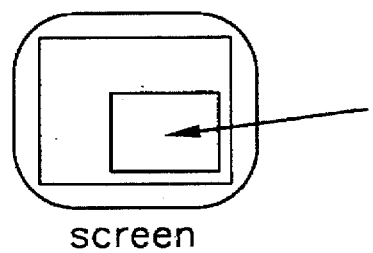
FIGS. 4A, 4B, 4C and 4D illustrates various update techniques in accordance with a preferred embodiment.
Figure 4B:
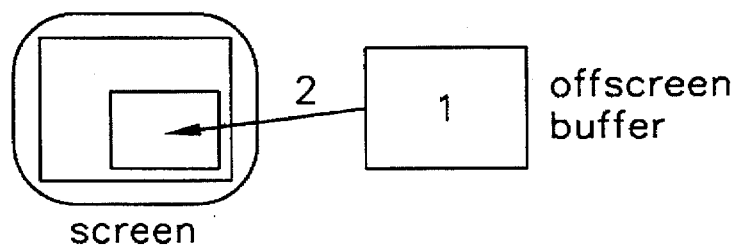
Figure 4C:
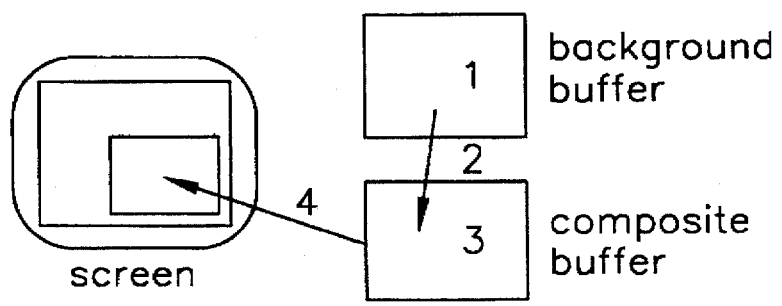
Figure 4D:
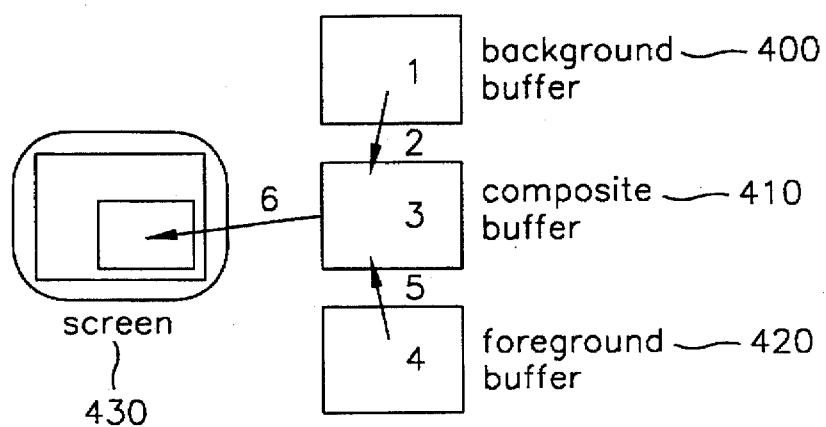

These are objects that define an updating strategy for component canvases. They are plugged into a canvas using the canvas SetUpdater method. The unbuffered updater erases damaged area and just redraw all objects onscreen that intersect damage area. FIG. 4A illustrates a single buffered updater in accordance with a preferred embodiment. The single buffered updater maintains a single valid offscreen bitmap. If it is called to redraw, it can only blit to the screen. FIG. 4B illustrates a double buffered updater in accordance with a preferred embodiment. The double buffered updater maintains two offscreen buffers: a background buffer which contains only unselected objects, and backgrounds like a grid; and a composit buffer which is used during repair operations. FIG. 4C shows the sequence of events for a redraw using a double buffered updating policy. Canvas updaters include support for unbuffered updating, single buffered updating, double buffered updating, and triple buffered updating. Triple buffering is illustrated in FIG. 4D. Triple buffered updating maintains a background buffer 400 which holds all unselected objects that are fully behind selected objects. A foreground buffer 420 which holds all unselected objects fully in front of selected objects, and a composit buffer 410 which is used during repair operations. All the buffered updating strategies consume memory. In case the canvas is big, caching the whole canvas in offscreen buffers can become unreasonable (multi-megabytes). In this case, only the rectangle containing portions of the canvas currently visible on the screen can be cached. The buffers may need to be resized when the canvas is resized or zoomed and also need to be updated when the canvas is scrolled.

TCanvasUpdater Method Descriptions

TCanvasUpdater is an abstract base class, so its constructors are protected. The canvas and other objects such as the grid, pages or snappers may call DamageBackground, DamageMidground, DamageForeground. For example, if a grid is drawn under all components in the background, then when the grid changes, it will call DamageBackground with the extent of the canvas passed in as the damage area. These methods will not immediately update the display. Instead, they notify the updater that some part of the canvas area is no longer valid. A useful utility routine for subclasses is GetCanvas which returns the canvas for which the updater is responsible.

The GrafEdit release includes three subclasses of TCanvasUpdater: TUnbufferedUpdater, TSingleBufferedUpdater, TDoubleBufferedUpdater. These correspond to strategies one to three described in the previous paragraphs.

Location Constraining Framework

Grids

Most drawing programs on the market have optional rectangular grids. Grids are used to constrain drawings while creating or editing shapes. Some examples of grids, in accordance with a preferred embodiment, are listed below. Rectangular, hexagonal, isometric (for architectural drawing, with an a degree slant), concentric radial, typographic (ascender, baseline, descender), chessboard (limited to 8×8), one- two- or three-point perspective grids, page layout grids, and staffs for sheet music. Any grid can be turned on and off. A second, independent variable controls whether a grid should be visible. Some grids are position invariant, some are more position-sensitive, like a radial grid with concentric circular grid lines. For the latter type of grid, provide components that are coupled to the grid and provide direct manipulation. The components can change the center of the radial grid for example, or the vanishing points of a perspective grid. Grids will also be described in more detail below in the chapter on canvas accessories. The default grid is an instance of TRectangularGrid.

Snap-to object

Figure 5:
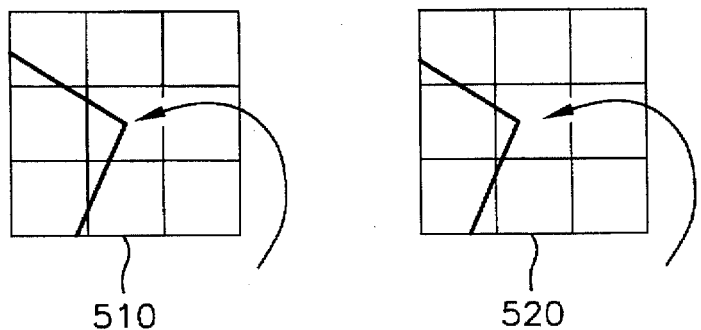
FIG. 5 shows an enlarged illustration of nine pixels on a display screen in accordance with a preferred embodiment.

A preferred embodiment enables snapping the cursor to other object features as well as to the grid. This feature is extremely useful for rapidly creating exact drawings. In a fully floating point graphic system, where drawings are routinely scaled up and down and displayed on monitors with varying resolutions, snapping to objects is essential. This is because hitting the same pixel does not mean the same coordinate has been selected after you scaled, moved or rotated a drawing, even slightly. FIG. 5 shows an enlarged illustration of nine pixels on a display screen. Each of the squares represents a single pixel. A polyline is illustrated at 510 which is rendered as a hairline by clicking at the indicated pixel. The drawing, including the polyline, is copied and pasted into another document, and slightly scaled. Note that at 520, the polyline has apparently moved slightly towards the left. To add another polyline, which is supposed to connect to the corner in the first one, the corner still appears over the same pixel, but it is obvious that without help it would be impossible to hit the shifted corner coordinates precisely. Instead, click at the pixel center, as before. Now when the drawing is scaled or moved, such as when it is printed, the disparity between what was visible on the screen, and what was drawn becomes clear. Snap-to object solves this problem by providing little "gravity" fields around the points and edges of other objects. When the cursor is proximal to a gravity field, the cursor is "sucked into" the center of the field. The snapping distance is defaulted to approximately half an inch. However, a user can modify the snapping distance as necessary to optimize performance.

Semantic Snapping

Figure 6:
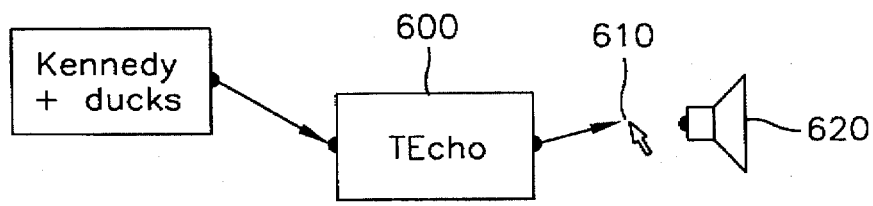
FIG. 6 illustrates a snap-to object in accordance with a preferred embodiment.
Figure 7:
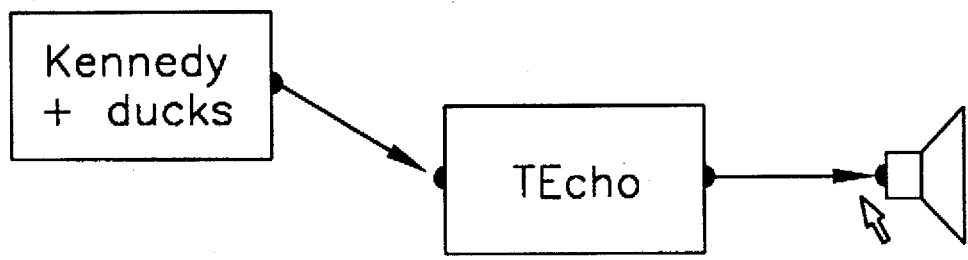
FIG. 7 illustrates a completed semantic snapping operation in accordance with a preferred embodiment.

In addition to drawing very pretty and precise drawings, snap-to object can be useful in other situations to provide semantic feedback. FIG. 6 illustrates a snap-to object in accordance with a preferred embodiment. A connection 610 is dragged from the TEcho unit 600. The connection 610 is drawn in gray to indicate that it is still incomplete because one endpoint at the speaker 620 is floating. FIG. 7 illustrates a completed semantic snapping operation in accordance with a preferred embodiment. In FIG. 7, the connection has been snapped to the input of a speaker unit. Several things to notice here: as soon as the cursor was detected within a "snapping radius" of the speaker's input port, a "snap-enter event" was triggered. A type negotiation transpired, and was handled in an application-specific way. For example, an audio connection may be dragged onto a sound input port, but not onto a volume input port. Second, as long as the cursor stays within the snapping radius, the connection stays snapped to the speaker port. This gives important feedback that something has actually happened during the drag. Without this feedback, some trackers would require a user to "just let go" over a port. Then, the tracker would have to do all their hit-detection and type-checking after the fact. By then, it is too late to correct a mistake. In addition to visually locking on to the speaker port, the connection turned black, informing the user that a legal connection would result if the mouse button was released.

As an example, suppose the connection is dragged away from the speaker port. As soon as the cursor vacates the snap region of the port, the connection unlocks and the endpoint once again follows the cursor. Also, the connection is drawn gray again. This is referred to as a "snap-leaving event". An application may even give audio-feedback for snap-enter and snap-leaving events. Now, if the connection was dragged back to the input of the echo unit, the connection would be invalid, since it would result in feedback and the echo unit locking up. On the snap-enter event, the connection's endpoint once again has locked on to an input port. Type-negotiation confirms the right data type, but a topology check finds a circular path and feeds back to the user that the connection cannot be made. This feedback stays in place for as long as the cursor remains within snapping radius of the input port. On the snap-leaving event, the feedback is taken down and the user is free to explore other possibilities. Giving extensive feedback during the actual track provides the following application benefits.

- avoids creation of illegal data structures;
- gives explicit confirmation of a "good" track (i.e. it is ok to let go);
- explains in a very context-specific way why something does not work; and
- avoids repetitive actions (like picking up the tool again and retargeting the connection source) by being fault-tolerant—you can always back out.

Idle And Tracking Snap Objects

The component canvas currently has two types of snap objects: an idle snapper and a tracking snapper. These objects may both be of the same type, but usually they are not. The idle snapper is used, if it is turned on, even when the mouse is up. It is called when there is nothing else to do in the application framework's main event loop. The idle snap object identifies components or locations the cursor would snap to if the button were pressed at the current location. The idle snap object also provides visual feedback. There is always an idle snap object allocated, but snapping may be turned off. The tracking snap object is something the trackers use in their TrackContinue. Tracking snappers are different for different kinds of trackers. For example, a TCreateRectTracker could snap to any significant location on any other component, but a TCreateConnectionTracker would snap only to connector locations or to connectors of the right type and direction. The default for both the idle snap and tracking snap objects is a TStandardSnap instance, with snapping turned off.

Canvas Grids

Grids facilitate constrained drawing and positioning of objects. TCanvasGrid is an abstract base class, so all constructors are protected. The base class defines protocol for turning the grid snapping on and off and turning the grid display on and off: GetActive, SetActive, GetVisible, SetVisible. These methods simply set Booleans inside the object, they do not draw or constrain. The canvas DrawBackground method calls the grid's Draw method. For snapping to the grid there are two versions of Constrain. The first one takes a single TGPoint argument. It is invoked from a tracker in their DoFirstTime methods. The point snap version of Constrain snaps the input argument to the nearest grid point and returns the modified point. It also returns a Boolean if the point has actually been modified. Some grids do not use this first version of Constrain at all, so they always return FALSE. The second version of Constrain takes two TGPoints and is usually called from a tracker's DoTrackContinue method. This is a "directional" snap and facilitates snapping based on a little more context. For example, when drawing a polyline, you may want to snap to only horizontal or vertical lines. Isometric and perspective grids also use this directional snap. The default point snap version of Constrain does nothing. The default directional snap calls the point snap method with its second argument. This is a reasonable default, since then you do not have to override the directional snap if your grid does not have one.

Figure 8:
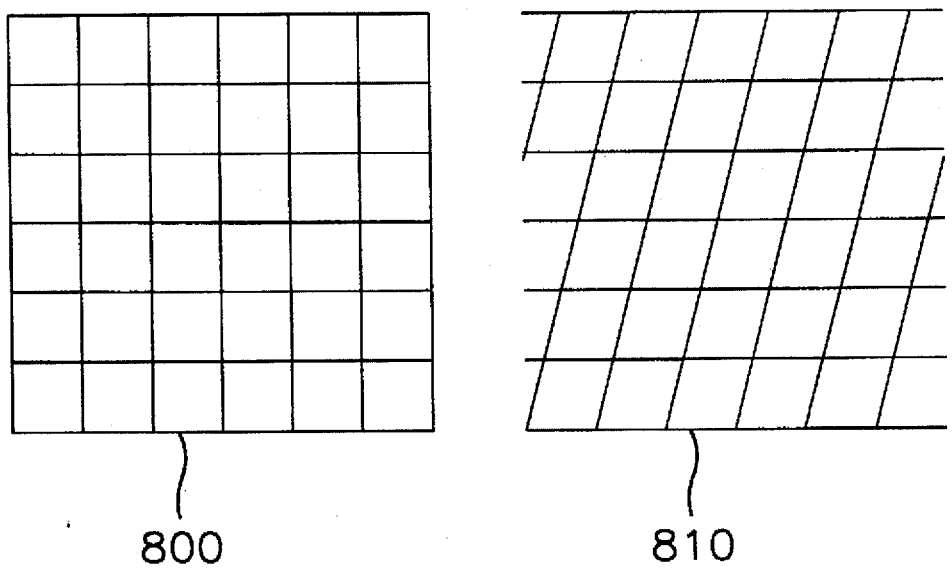
FIG. 8 illustrates a rectangular grid 800 and an isometric grid 810 in accordance with a preferred embodiment.
Figure 9:
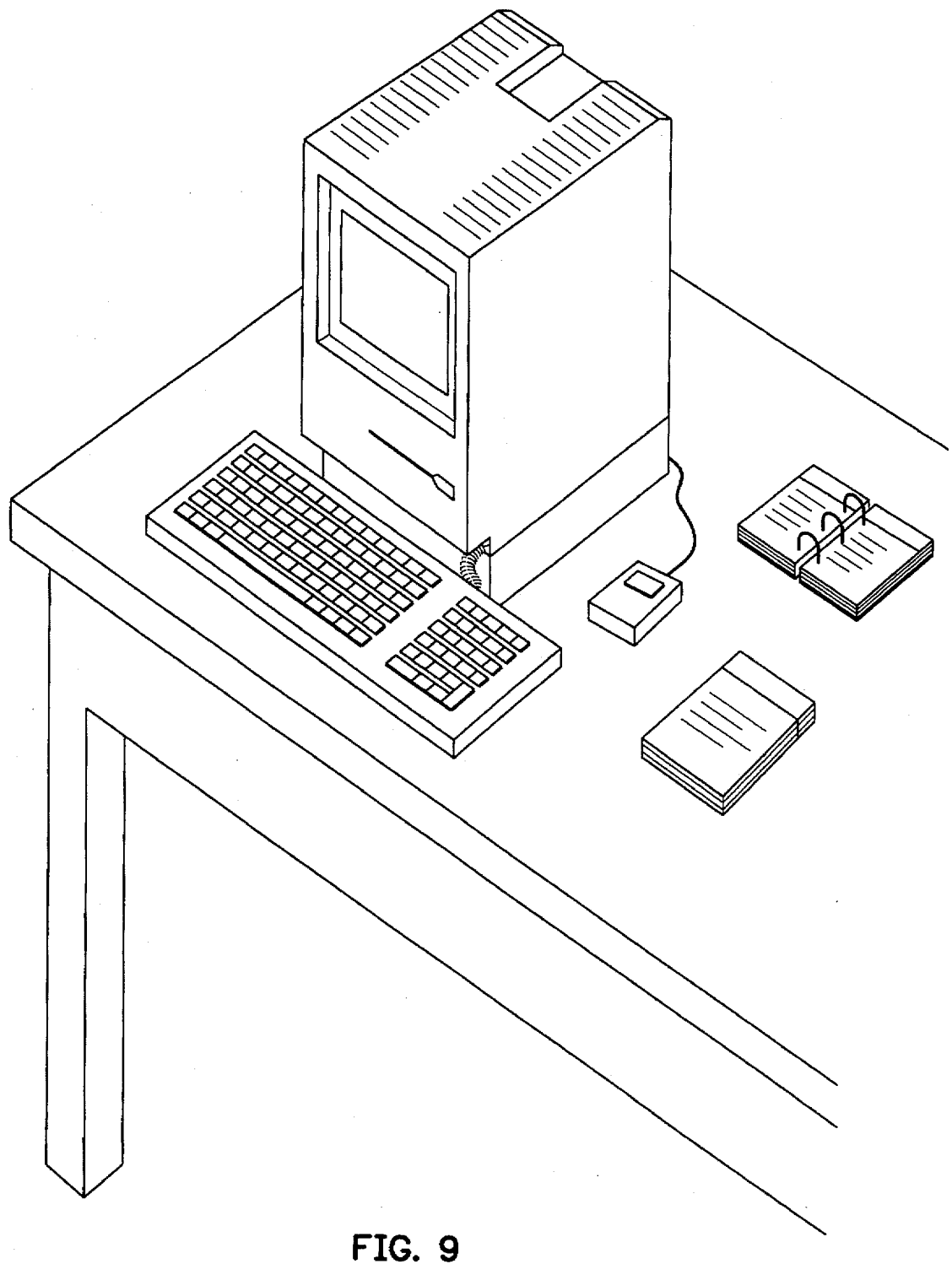
FIG. 9 is an example of an architectural rendering in accordance with a preferred embodiment.
Figure 10:
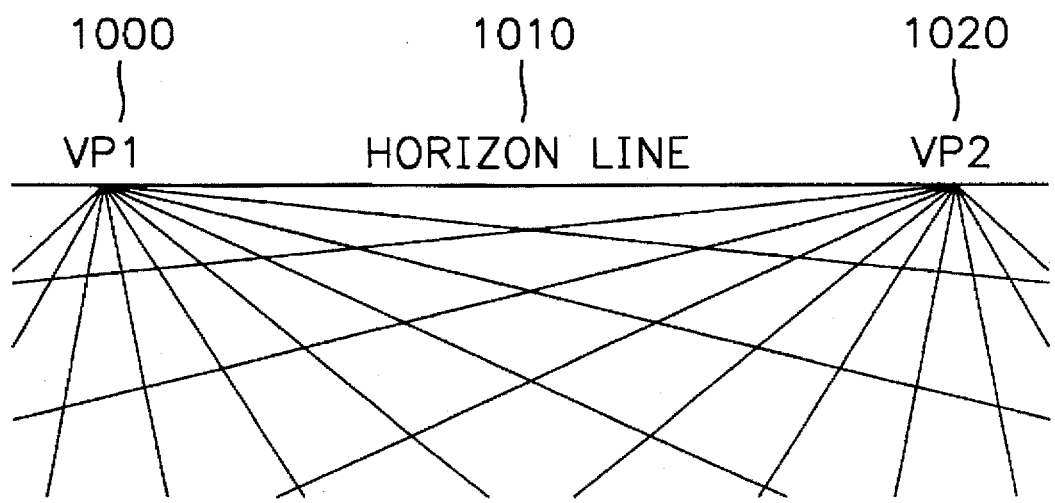
FIG. 10 illustrates a perspective grid in accordance with a preferred embodiment.

MCollectible routines and operators are also implemented for TCanvasGrid. A few example grids are provided for examples, such as TRectangularGrid, TIsometricGrid, and TPerspectiveGrid. FIG. 8 illustrates a rectangular grid 800 and an isometric grid 810. The TRectangularGrid snaps to a rectilinear grid of points. It does not have a directional snap. The isometric grid adds directional snap along a slanted direction. The angle is a parameter that can be set). The point snap constrains to a skewed grid, the directional snap constrains to horizontal, vertical or the diagonal direction. This kind of grid is often used for architectural renderings and illustrations. FIG. 9 is an example of an architectural rendering in accordance with a preferred embodiment. Most lines in FIG. 9 follow three main directions which is similar to the isometric grid. The TPerspectiveGrid is a two-point perspective grid. FIG. 10 illustrates a perspective grid in accordance with a preferred embodiment. The height of the horizon line 1010 and the location of the two vanishing points 1000 and 1020 on the horizon line are specified.

Perspective grid

Figure 11:
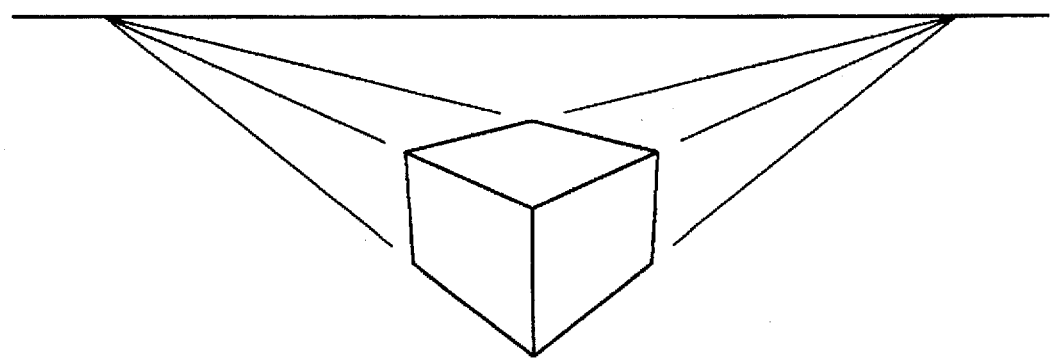
FIG. 11 illustrates a perspective drawing of a cube made using a two point perspective grid in accordance with a preferred embodiment.

In a two-point perspective, all lines drawn are either vertical or converge to one of the two vanishing points. The directional snap accomplishes this. No point snap is applied. FIG. 11 illustrates a perspective drawing of a cube made using a two point perspective grid in accordance with a preferred embodiment.

Canvas Snaps

TCanvasSnap is an abstract base class for defining snap-to-object behavior. Snapping to other objects is very similar to snapping to a grid. So just like the TCanvasGrid, the TCanvasSnap base class defines protocol for turning the object snapping on and off and turning the snap feedback on and off: GetActive, SetActive, GetFeedbackVisible, SetFeedbackVisible. Also like a grid, it defines a point snap and a directional snap version of Constrain.

Snap transitions: SnapEnter, SnapLeave

A snap object remembers the type, and location of the last snap, and whether the last constrain call actually did cause a snap or not. This information is used to detect a snap-state change. For example, if the last Constrain call did not snap, but this one does, then a snap "region" has been entered. After setting the member variables to the new snap parameters, a Constrain method calls SnapEnter. Similarly, if the last Constrain call did cause a snap, but the current one does not, it should call SnapLeave with the old snap parameters. If both the previous and the current call to Constrain caused a snap, but a different kind or location, then Constrain should call SnapLeave with the old snap parameters, and then SnapEnter after updating the members to reflect the new snap. If nothing has changed between the last and the current call to Constrain, no call is necessary.

A few other routines support snap feedback, which is usually some kind of graphic or extra cursor that shows the type and location of the current snap. SnapEnter displays a graphic and SnapLeave restores the old bits under the snap feedback, thus erasing it. The routines Draw, GetBounds (of the snap feedback graphic) and IsSnapped provide support for this. Usually, SnapEnter calls Draw, and SnapLeave calls GetBounds to determine an area to repair.

The graphic editor framework consists of the above described classes plus a plurality of other classes and provides a mechanism by which an application developer can use these classes to develop an graphic editing application. The developer can use the default classes and actions or can override the defaults and implement customized classes and actions.

Figure 12:
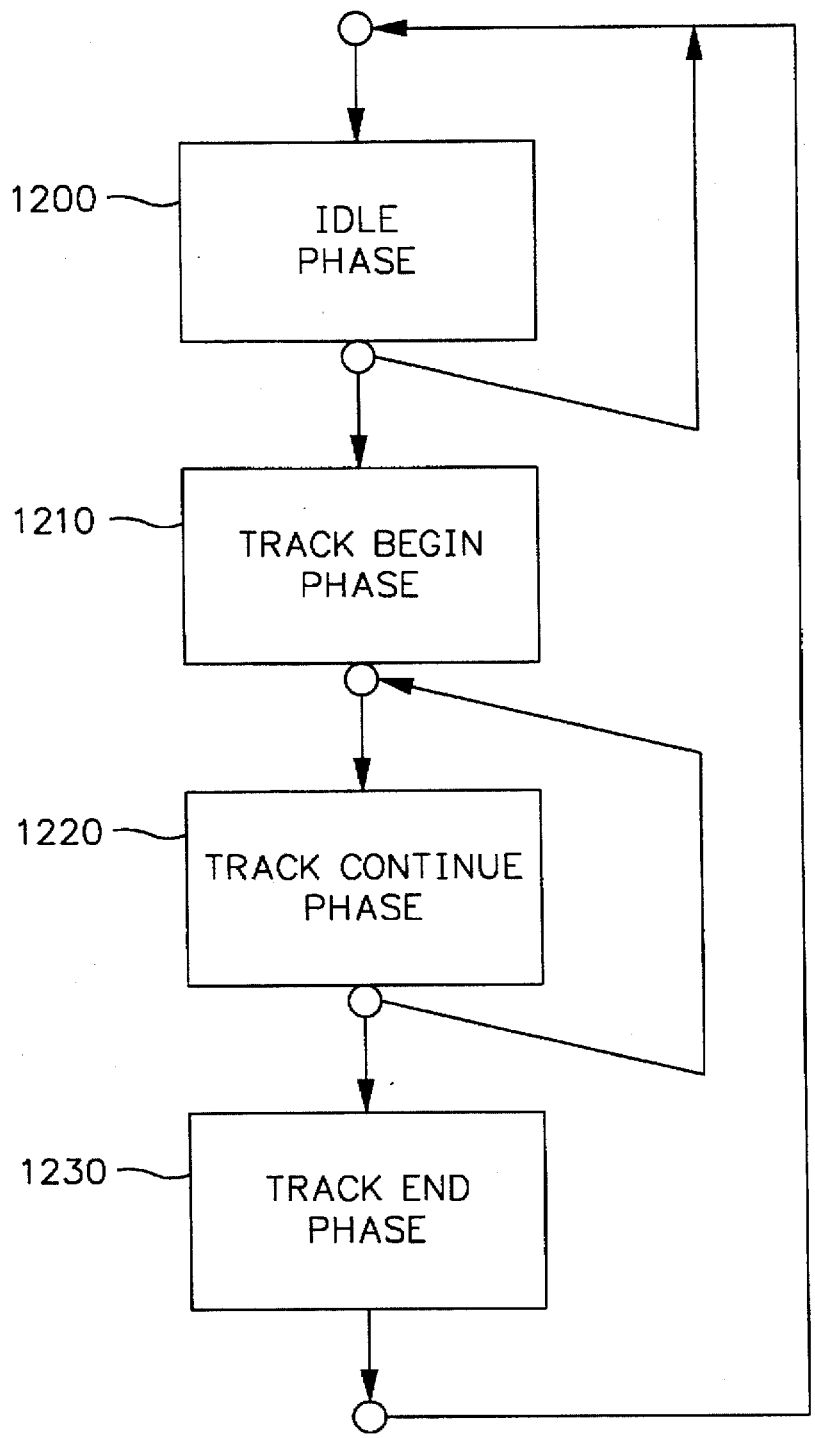
FIG. 12 is a flowchart of the detailed logic associated with location constraining framework in accordance with a preferred embodiment.

FIG. 12 is a flowchart of the detailed logic associated with location constraining in accordance with a preferred embodiment. Processing commences at function block 1200 where a wait state is entered until a mouse movement or other cursor interaction is detected. Then, at function block 1210 a track begin phase is entered to commence the tracking process once a cursor movement is detected. The tracking process continues in function block 1220 until the tracking process is terminated at function block 1230.

Figure 13:
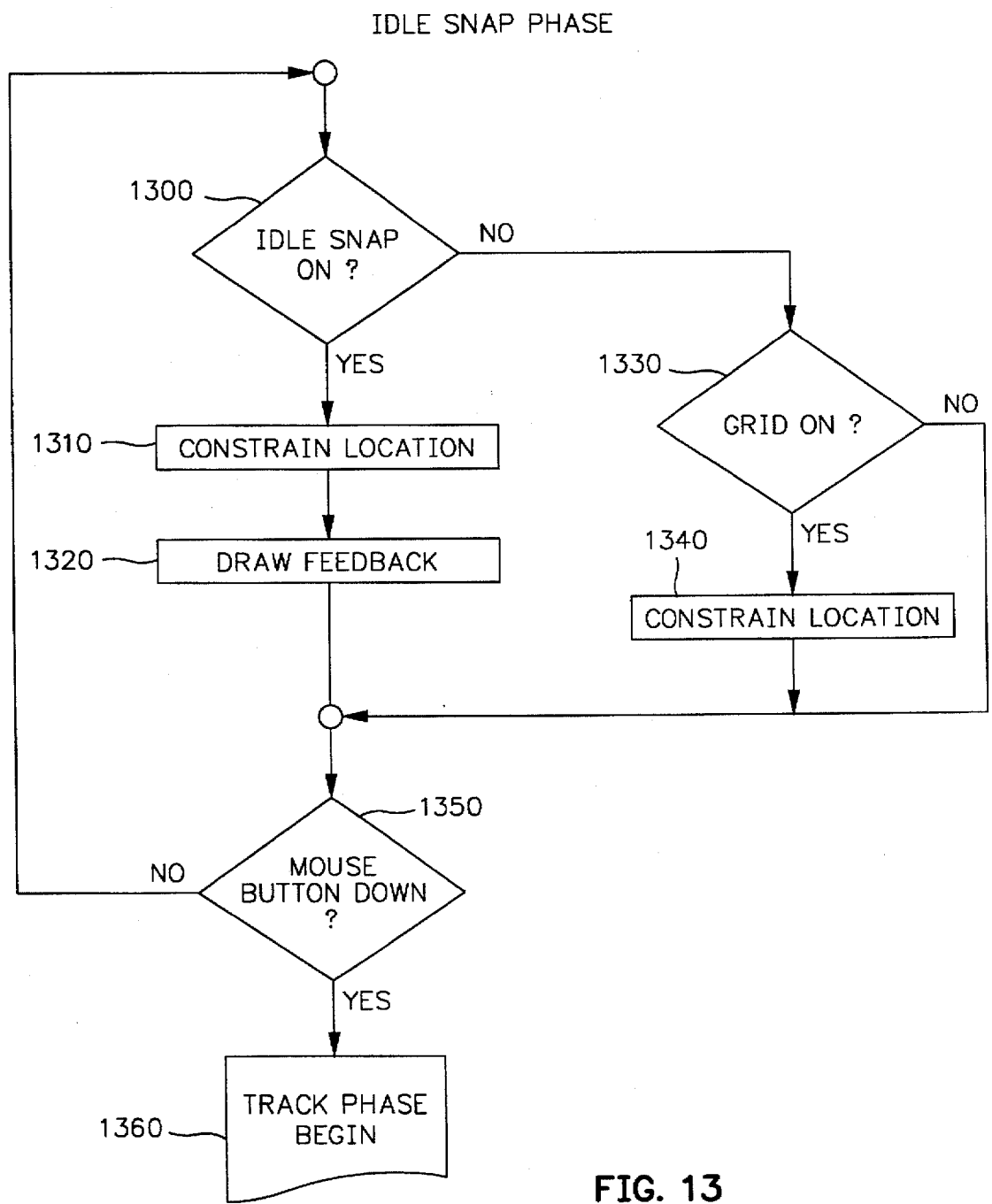
FIG. 13 is a flowchart of the detailed logic associated with idle snap phase in accordance with a preferred embodiment.

FIG. 13 is a detailed flowchart of the idle snap phase, function block 1200 of FIG. 12, in accordance with a preferred embodiment. Processing commences at decision block 1300 where a test is performed to determine if idle snap processing is currently active. If idle snap processing is active, then the location is constrained at function block 1310 and draw feedback is given to the application to feedback to the user at function block 1320. If idle snap processing is not active, then a test is performed at function block 1330 to determine if a background grid is active. If a grid is active, then the location is constrained at function block 1340 and control passes to decision block 1350. At decision block 1350, a test is performed to determine if the mouse button is down. If so, then control is passed to function block 1360 which corresponds to the logic at function block 1210 of FIG. 12. If the mouse button is not pressed down, then control returns to decision block 1300 to test if the idle snap is on.

Figure 14:
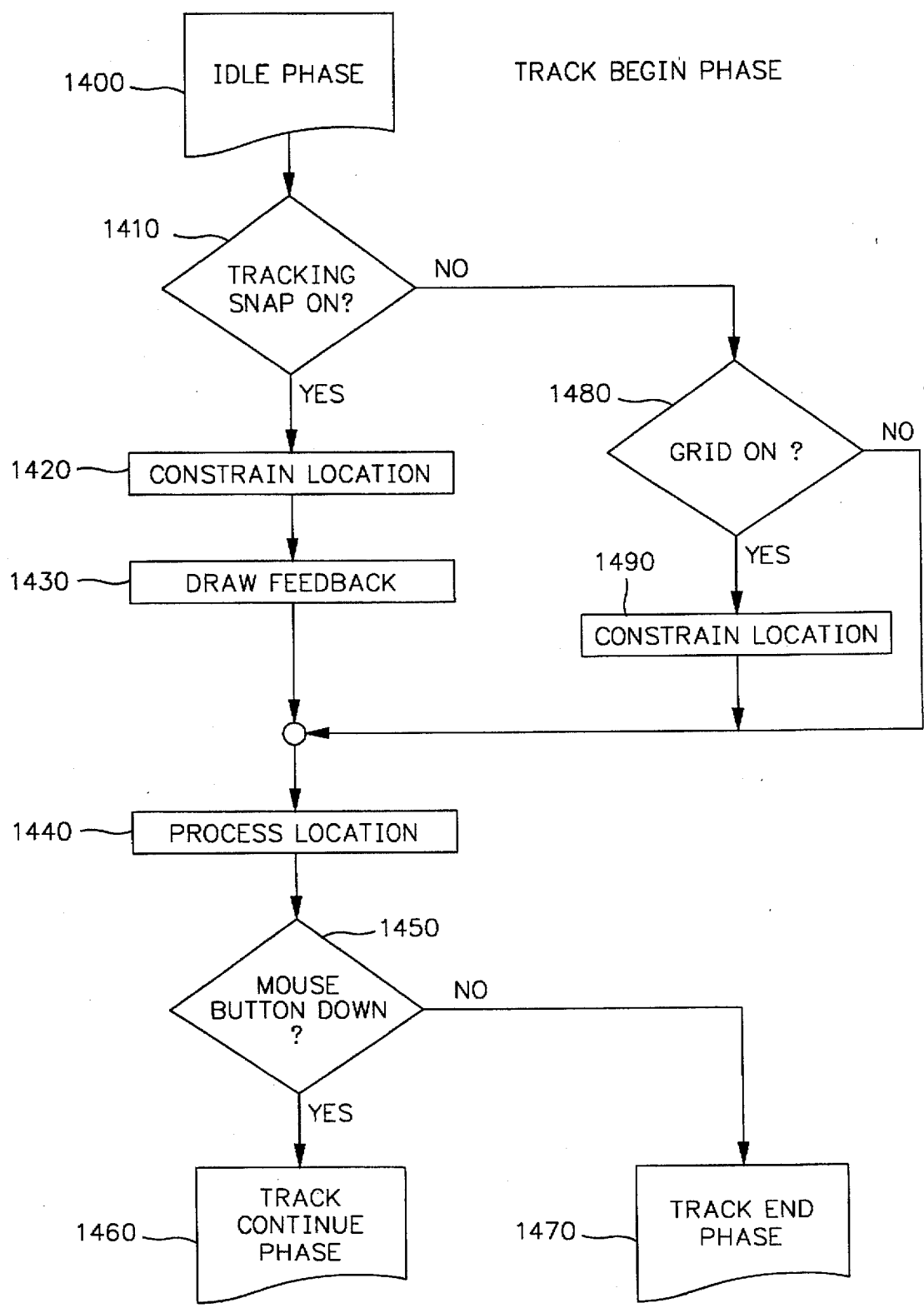
FIG. 14 is a flowchart of the detailed logic associated with track begin phase in accordance with a preferred embodiment.

FIG. 14 is a detailed flowchart of the logic associated with track begin phase, function block 1210 of FIG. 12, in accordance with a preferred embodiment. Processing commences at function block 1400 where control is passed form the idle phase (FIG. 13 detail of function block 1200 of FIG. 12). Then, a test is performed at decision block 1410 to determine if tracking snap on processing is active. If so, then at function block 1420, the location is constrained and at function block 1430, draw feedback is passed back to the application to present to the user. If tracking is not on at decision block 1410, then at decision block 1480, a test is performed to determine if a background grid is activated. If so, then at function block 1490, the location is constrained. If not, then control passes directly to function block 1440 to process the location. Then, at decision block 1450, a test is performed to determine if the mouse button is pressed down. If so, then control passes via function block 1460 to the track continue phase detailed in FIG. 15. If not, then control is passed via function block 1470 to the track end phase detailed in FIG. 16.

Figure 15:
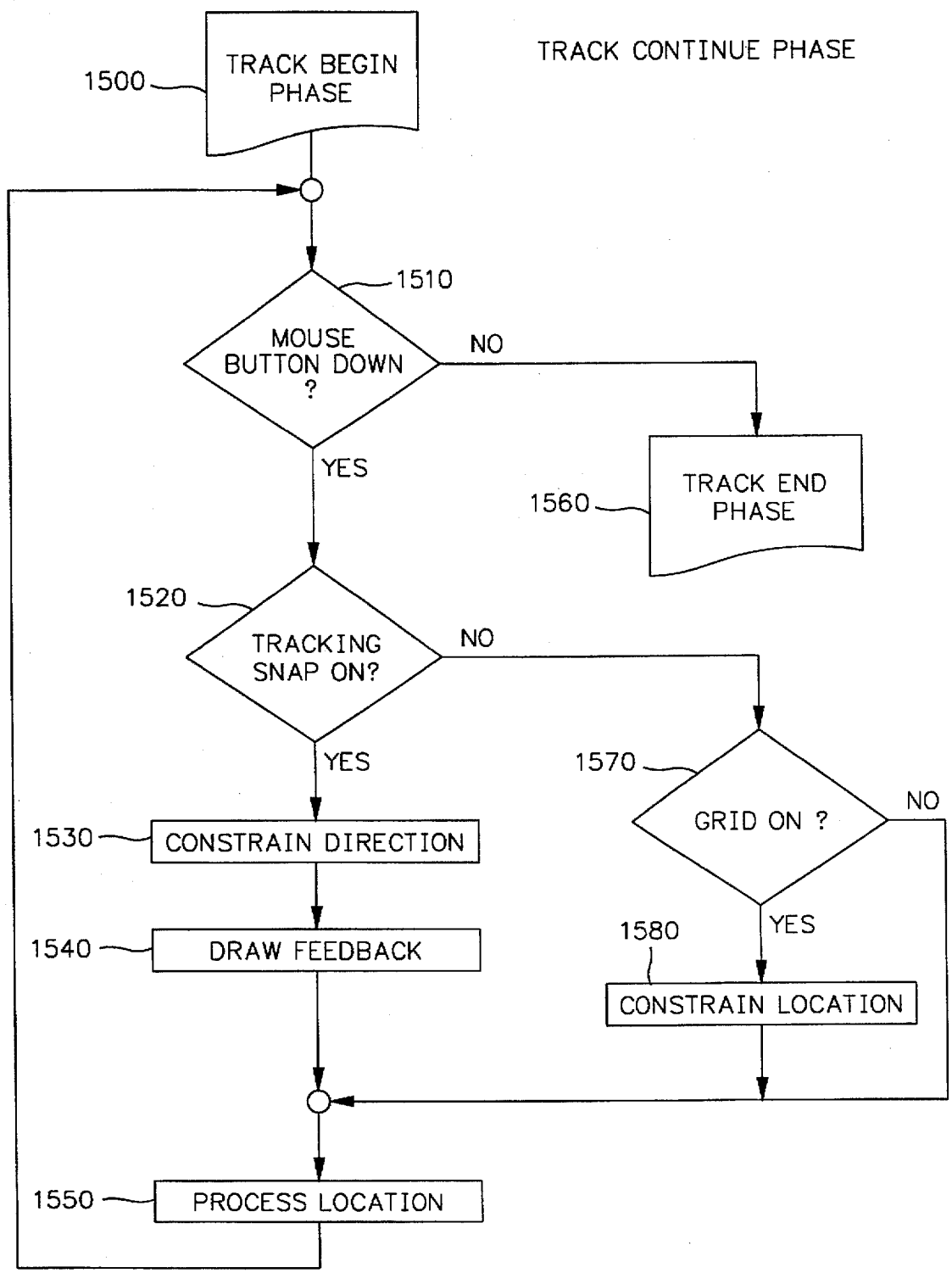
FIG. 15 is a flowchart of the detailed logic associated with track continue phase in accordance with a preferred embodiment.

FIG. 15 is a detailed flowchart of the logic associated with the track continue phase in accordance with a preferred embodiment. Processing commences at function block 1500 where control passes from the track begin phase detailed in FIG. 14. A test is immediately performed at decision block 1510 to determine if the mouse button is down. If so, then at decision block 1520, a test is performed to determine if tracking snap is active. If so, then at function block 1530, the direction is constrained and at function block 1540, draw feedback is fed back to the application to be displayed to the user. If the mouse button was not down at decision block 1510, then control is passed via function block 1560 to the track end phase which is detailed in FIG. 15. If tracking snap is not activated at decision block 1520, then another test is performed at decision block 1570 to determine if a background grid is active. If so, then the location is constrained at function block 1580. If not, then control is passed to function block 1550 to process the location and then control is passed to decision block 1510 to iterate through the loop again.

Figure 16:
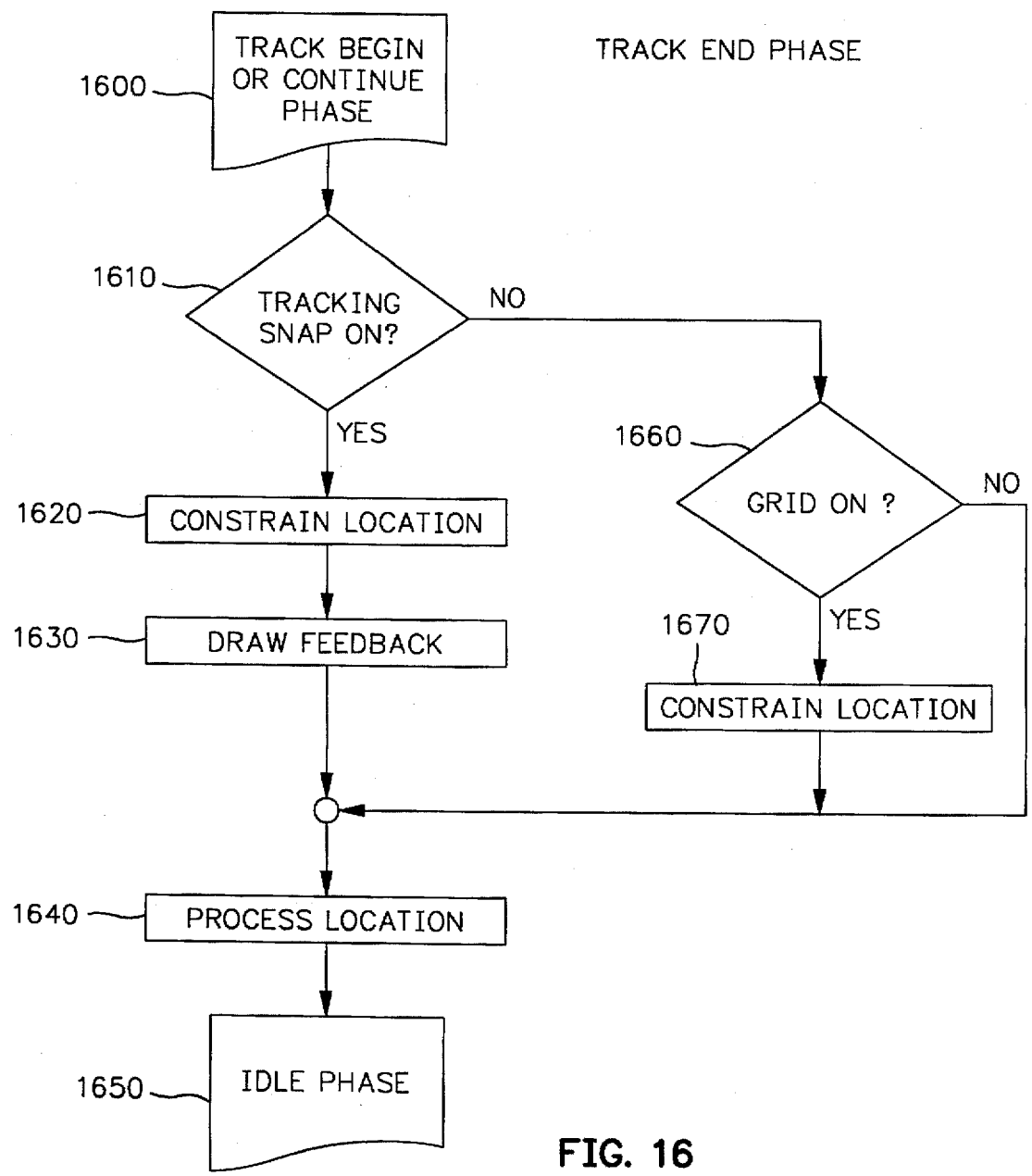
FIG. 16 is a flowchart of the detailed logic associated with track end phase in accordance with a preferred embodiment.

FIG. 16 is a detailed flowchart of the logic associated with the track end phase in accordance with a preferred embodiment. Processing commences at function block 1600 where control is passed from the track begin (FIG. 14) or track continue (FIG. 15) processing. A test is immediately performed at decision block 1610 to determine if tracking snap is active. If so, then the location is constrained at function block 1620, and feedback is passed back to the application to display draw information to the user. If tracking snap is not active at decision block 1610, then another test is performed at decision block 1660 to determine if a background grid is active. If a grid is active, then the location is constrained at function block 1670, and control is passed to function block 1640. If a grid is not active, then control is passed to function block 1640 where the location is processed, and control is passed to function block 1650 to enter the idle phase detailed in FIG. 13.

The C++ code associated with the heretofor functions is presented below to further clarify a preferred embodiment.

```
// -© COPYRIGHT TALIGENT, Inc. 1993
// DoTrackFirstTime
// ----------------------------------------
TTracker* TRectangleTracker::DoTrackFirstTime( TGPoint& p, const. TEvent &)
{
    HandlesSnapping( p );
    fRect = TGRect( p, p );
    return this;
}
// ----------------------------------------
// DoTrackContinue
// ----------------------------------------
TTracker* TRectangleTracker::CoTrackContinue( TGPoint& p, const TEvent &)
{
    TGrafPort* onscreen = GetOnscreenDrawingPort();
    // constrain direction if necessary
```

```
    HandleSnapping( GetOriginalClickLoc(), p );
    // restore bits synchronously under old feedback by calling canvas updater
    // calling view system Invalidate() here would be asynchronous, and we would
    // draw the new rect (below), only to have it subsequently overdrawn by an Update
    event.
    GetCanvas()->GetUpdater().Draw( fRect, onscreen );
    // update fRect to reflect new mouse location
    fRect = TGRect( GetOrginalClickLoc( ), p );
    // draw new rect feedback straight on screen
    onscreen->Draw( fRect, TFrameBundle(TRGBColor(1.,0.,0.)) );
    return this;
}
// ----------------------------------------------------------
// DoTrackLastTime
// ----------------------------------------------------------
void TRectangleTracker::DoTrackLastTime( TGPoint& , const TEvnt &)
{
    // restore bits under old feedback by calling canvas updater
    GetCanvas()->GetUpdater().Draw( fRect, GetOnscreenDrawingPort() );
}//  ----------------------------------------------------------
// DoDoneWithTracking
// ----------------------------------------------------------
void TRectangleTracker::DoDoneWithTracking()
{
    if( fRect.fLect!=fRect.fRight. II fRect.ftop!=fBottom ) {
        // if fRect is not degenerate, create a new rect componet
        TRectComponent* newRectComponent = new TRectComponent( fRect );
        newRectComponent ->SetBundle( TGrafBundle( . . . ) );
        //now wrap the component in a TNewComponentOmd and send it off
        TNewComponentCmd omd( GetEncapsulator() );
        omd.AdoptComponent( newRectComponent );
        omd.Do();
    }
    delete this;
}
```

While the invention has been described in terms of a single preferred embodiment, those skilled in the art will recognize that the invention can be practiced with modification within the spirit and scope of the appended claims.

Having thus described our invention, what we claim as new, and desire to secure by Letters Patent is:

1. Apparatus operating on a computer system having a memory and a display for displaying a plurality of graphical images, the apparatus repairing damage caused by changes in the images in response to graphic change commands, and the apparatus comprising:

(a) means for modeling the plurality of graphical images as a plurality of graphic component objects in the memory, each of the graphic component objects having graphic data stored therein representing one of the plurality of graphic images and having means for rendering on the display, the graphic data in the each graphic component object;

(b) canvas view means including means for selecting ones of the plurality of graphic component objects and for controlling said selected graphic component objects to render graphic data therein on the display and means responsive to the data change commands for generating view damage signals; and (c) update means contained within the canvas view means and responsive to the view damage signals for repairing view damage in accordance with a predetermined policy.

2. Apparatus as recited in claim 1 wherein the update means includes an unbuffered updater object which renders changed portions of graphic data by controlling said canvas view means to select graphic component objects to render selected graphic data therein.

3. Apparatus as recited in claim 1, wherein the update means includes a single-buffered updater object having a data structure for storing a graphical image of the entire display and member functions for copying the entire display graphical image to the display.

4. Apparatus as recited in claim 1, wherein the update means includes a double-buffered updater object comprising:

a background buffer containing graphic data from unselected graphic component objects; and a composite buffer containing a graphical image of the entire display for redrawing changed portions of the entire display graphical image.

5. Apparatus as recited in claim 1, wherein the update means includes a triple-buffered updater object for maintaining a background buffer which contains data from unselected graphic component objects, a foreground buffer which contains graphic image data from selected graphic component objects and a composite buffer containing a graphical image of the entire display for redrawing changed portions of the entire display graphical image.

6. Apparatus as recited in claim 1, including a grid object for generating a grid on the display, the grid comprising a plurality of grid lines and a plurality of constraint objects, each of the constraint objects containing member functions for moving a point selected within a predetermined radius of one of the plurality of grid lines to the one grid line.

7. Apparatus as recited in claim 6 wherein at least one of the plurality of constraint objects constrains graphical images rendered on the display screen by one of the plurality of graphic component objects to a particular position on the display screen.

8. Apparatus as recited in claim 7, including a constraint object which utilizes a semantic constraint to change the appearance of graphic image based on the position of the graphic image on the display screen.

9. Apparatus as recited in claim 8, wherein the constraint object constrains a predetermined portion of a graphical image rendered on the display, wherein the predetermined portion of the graphical image corresponds to a first one of a corner, a side, a center and a midpoint of the graphical image.

10. Apparatus as recited in claim 8, wherein the constraint object aligns a connection port of a graphical component corresponding to a graphical image rendered on the display to a predetermined position on the display.

11. Apparatus as recited in claim 6, wherein each of the graphic component objects includes:
   means for providing a unique identification value to each of a plurality of selected graphical images rendered on the display; and
   means for storing each unique identification value in a data store object, for use in a comparison between selected ones of the plurality of graphical components.

12. Apparatus as recited in claim 1, including a constraint object which constrains graphical images rendered on the display screen by one of the plurality of graphic component objects along predetermined geometric pattern.

13. Apparatus as recited in claim 12, wherein the constraint object constrains graphical images rendered on the display screen by one of the plurality of graphic component objects along portions of a rectangular grid.

14. Apparatus as recited in claim 12, wherein the constraint object constrains graphical images rendered on the display screen by one of the plurality of graphic components along portions of a polar grid.

15. Apparatus as recited in claim 12, wherein the constraint object constrains graphical images rendered on the display screen by one of the plurality of graphic components along portions of a perspective grid.

16. Apparatus as recited in claim 1, further comprising model means for containing the plurality of graphic component objects, wherein the model means comprises means responsive to commands for editing a graphic component object for creating an interactor object and for passing the interactor object to the graphic component object to change the graphical data therein.

17. Apparatus as recited in claim 16, wherein the interactor objects can be instantiated while a program is operational.

18. Apparatus as recited in claim 1, including means for associating a constraint object with the canvas view means.

19. Apparatus for managing a plurality of graphical images in a document on a computer system having a memory and a display screen, the apparatus repairing view damage caused by changes to the graphical images and comprising:
   (a) a plurality of component objects in the memory, each of the plurality of component objects having data defining one of the plurality of graphical images and a member function responsive to the data for drawing the one graphical image on the display screen;
   (b) a model object in the memory having a data structure therein for storing a reference to each of the plurality of component objects;
   (c) means for constructing a canvas view object in the memory, the canvas view object having a data structure for storing lists of graphic component objects having images displayed on the display screen and methods for indicating view damage when displayed component images are selected and moved; and
   (d) a plurality of update objects, each of which has methods which redraw the view associated with the canvas view object in accordance with a predetermined policy; and
   (e) means for associating one of the update objects with the canvas view object so that the one update object is responsive to indicated view damage for redrawing damaged areas in a predetermined manner.

20. Apparatus as recited in claim 19 wherein each of the plurality of component objects includes a member function for editing the data in the each component object and a member function for selecting the data in the each component object.

21. Apparatus as recited in claim 19 wherein the model object includes member functions for adding references to component objects to the data structure, and deleting references to component objects.

22. Apparatus as recited in claim 19 wherein the canvas view object includes data identifying a model object.

23. Apparatus as recited in claim 19 wherein the canvas object image list data includes a list of background objects that are fully behind all objects currently selected, a list of foreground objects that are in front of all objects currently selected and a list of midground objects that are not in the background or foreground lists.

24. Apparatus as recited in claim 19 wherein the canvas view object includes a grid object having data for defining a grid consisting of a plurality of lines on the display screen and a member function for displaying the grid on the display screen.

25. Apparatus as recited in claim 24 wherein the canvas view object includes a snap-to object having member functions for causing a displayed point to snap to one of the plurality of grid lines.

26. A method for managing a plurality of graphical images in a document on a computer system having a memory and a display screen, the method comprising the steps of:
   (a) constructing a plurality of component objects in the memory, each of the plurality of component objects having data defining one of the plurality of graphical images and a member function responsive to the data for drawing the one graphical image on the display screen;
   (b) constructing a model object in the memory, the model object having a data structure therein for storing a reference to each of the plurality of component objects;
   (c) constructing a canvas view object in the memory, the canvas view object having a data structure for storing lists of graphic component objects having images displayed on the display screen and methods for indicating view damage when displayed component images are selected and moved;
   (d) constructing an update object in the canvas view object, the update object including methods for repairing view damage in accordance with a predetermined policy; and
   (e) associating the update object with the canvas view object so that the repairing methods in the update object are called in response to the view damage signals to repair indicated view damage in a predetermined manner.

27. The method as recited in claim 26 wherein each of the plurality of component objects includes a member function for editing the data in the each component object and a member function for selecting the data in the each component object and wherein the method further comprises the step of:
   (f) calling the selecting member function in one of the plurality of component objects to select one of the plurality of component objects.

28. The method as recited in claim 26 wherein the model object includes member functions for adding references to component objects to the data structure, and deleting references to component objects and step (b) comprises the step of:

(b1) calling the adding member function to add references to a plurality of component objects to the model object.

29. The method as recited in claim 26 wherein the canvas view object includes data identifying a model object and wherein step (c) comprises the step of:

(c1) constructing the canvas view object using data identifying the model object constructed in step (b).

30. The method as recited in claim 26 wherein the canvas object image list data includes a list of background objects that are fully behind all object currently selected, a list of foreground objects that are in front of all objects currently selected and a list of midground objects that are not in the background or foreground lists and wherein the method includes the step of:

(c2) adding each of the component objects to one of the list of background objects, the list of foreground objects and the list of midground objects.

31. The method as recited in claim 26 further comprising the step of:

(g) constructing a plurality of update objects in the memory, each of the plurality of update objects responsive to the canvas object image list data for redrawing a view associated with the canvas view object according to a predefined updating strategy; and (h) associating one of the plurality of update objects with the canvas view object.

32. The method as recited in claim 26 further comprising the step of:

(i) constructing a grid object having data for defining a grid consisting of a plurality of lines on the display screen and a member function for displaying the grid on the display screen; and (j) inserting the grid object constructed in step (i) into the canvas view object.

33. The method as recited in claim 32 further comprising the step of:

(k) constructing a snap-to object having member functions for causing a displayed point to snap to one of the plurality of grid lines; and (l) inserting the snap-to object into the canvas view object.

34. The method as recited in claim 26 wherein step (d) includes the step of:

(d1) constructing a single-buffered update object having a data structure for storing a graphical image of the entire display and member functions for copying the entire display graphical image to the display.

35. The method as recited in claim 26 wherein step (d) includes the step of:

(d2) constructing a double-buffered update object comprising:
a background buffer containing graphic data from unselected graphic component objects; and
a composite buffer containing a graphical image of the entire display for redrawing changed portions of the entire display graphical image.

36. The method as recited in claim 26 wherein step (d) includes the step of:

(d3) constructing a triple-buffered update object for maintaining a background buffer which contains data from unselected graphic component objects, a foreground buffer which contains graphic image data from selected graphic component objects and a composite buffer containing a graphical image of the entire display for redrawing changed portions of the entire display graphical image.

37. The method as recited in claim 26 further comprising the step of:

(l) constraining graphical images rendered on the display by one of the plurality of graphic component objects to a particular position on the display.

38. The method as recited in claim 26, including the step of:

(m) constructing a constraint object which constrains graphical images rendered on the display screen by one of the plurality of graphic component objects along predetermined geometric patterns.

39. The method as recited in claim 38, wherein step (m) comprises the step of:

(m1) constructing a constraint object which constrains graphical images rendered on the display screen by one of the plurality of graphic component objects along portions of a rectangular grid.

40. The method as recited in claim 38, wherein step (m) comprises the step of:

(m2) constructing a constraint object which constrains graphical images rendered on the display screen by one of the plurality of graphic components along portions of a polar grid.

41. The method as recited in claim 38, wherein step (m) comprises the step of:

(m3) constructing a constraint object which constrains graphical images rendered on the display screen by one of the plurality of graphic components along portions of a perspective grid.

42. The method as recited in claim 38, wherein step (m) comprises the step of:

(m4) constructing a constraint object which utilizes a semantic constraint to change the appearance of a graphic image based on the position of the graphic image on the display screen.

43. The method as recited in claim 38, wherein step (m) comprises the step of:

(m5) constructing a constraint object which constrains a predetermined portion of a graphical image rendered on the display, wherein the predetermined portion of the graphical image corresponds to a first one of a corner, a side, a center and a midpoint of the graphical image.

44. The method as recited in claim 38, wherein step (m) comprises the step of:

(m6) constructing a constraint object which aligns a connection port of a graphical component corresponding to a graphical image rendered on the display to a predetermined position on the display.

45. The method as recited in claim 26, wherein step (a) comprises the step of:

(a1) constructing a plurality of graphic component objects wherein each of the graphic component objects includes:
means for providing a unique identification value to each of a plurality of selected graphical images rendered on the display; and
means for storing each unique identification value in a data store object, for use in a comparison between selected ones of the plurality of graphical components.

46. The method as recited in claim 26, wherein step (a) comprises the step of:

(a2) constructing a model container object having a member function responsive to commands for editing a graphic component object for creating an interactor object and a member function for passing the interactor object to the graphic component object to change the graphical data therein.

47. The method as recited in claim 46, wherein step (a2) includes the step of:

(a2a) instantiating the interactor objects while a program is operational.

48. A computer program product for managing a plurality of graphical images in a document on a computer system having a memory and a display screen, the computer program product comprising a computer usable medium having computer readable program code thereon, including:

(a) program code for constructing a plurality of component objects in the memory, each of the plurality of component objects having data defining one of the plurality of graphical images and a member function responsive to the data for drawing the one graphical image on the display screen;

(b) program code for constructing a model object in the memory, the model object having a data structure therein for storing a reference to each of the plurality of component objects;

(c) program code for constructing a canvas view object in the memory, the canvas view object having a data structure for storing lists of graphic component objects having images displayed on the display screen and methods for indicating view damage when displayed component images are selected and moved;

(d) program code for creating an update object in the memory which update object has methods which redraw the view associated with the canvas view object for repairing view damage in accordance with a predetermined policy.

49. The computer program product as recited in claim 48 wherein each of the plurality of component objects includes a member function for editing the data in the each component object and a member function for selecting the data in the each component object and wherein the computer program product further includes:

(f) program code for calling the selecting member function in one of the plurality of component objects to select one of the plurality of component objects.

50. The computer program product as recited in claim 48 further including:

(g) program code for constructing a plurality of update objects in the memory, each of the plurality of update objects responsive to the canvas object image list data for redrawing a view associated with the canvas view object according to a predefined updating strategy different from the updating strategy used by the other update objects.

51. The computer program product as recited in claim 48 further including:

(h) program code for constructing a grid object in the memory having data for defining a grid consisting of a plurality of lines on the display screen and a member function for displaying the grid on the display screen; and (i) program code inserting the grid object into the canvas view object.

52. The computer program product as recited in claim 51 further including:

(j) program code for constructing a snap-to object having member functions for causing a displayed point to snap to one of the plurality of grid lines; and (k) program code for inserting the snap-to object into the canvas view object.

* * * * *